July 10, 1928.  1,676,414
A. ROMANO ET AL
VALVE RESEATING MACHINE
Filed July 14, 1925
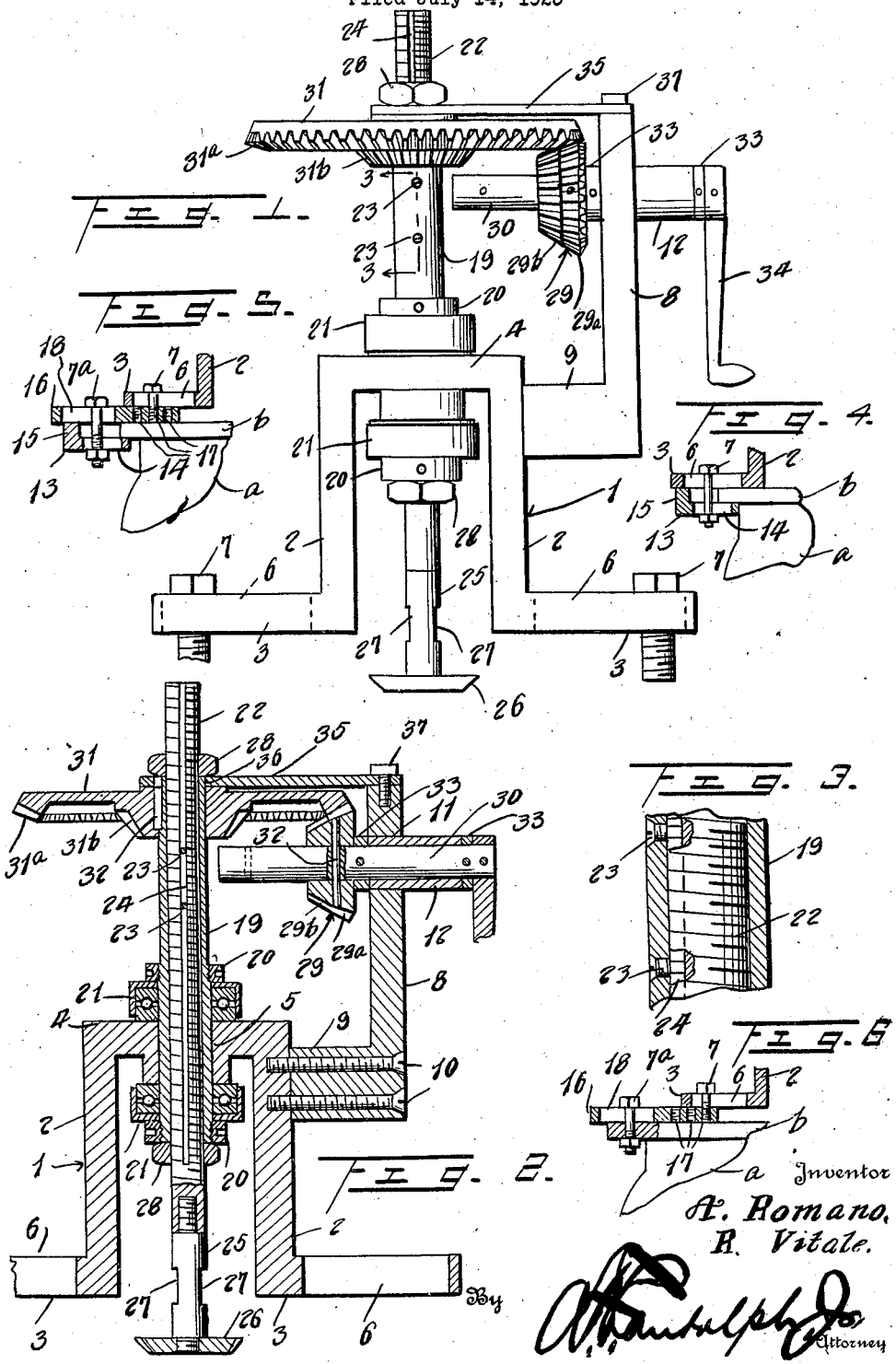
Inventor
A. Romano.
R. Vitale.
By
Attorney Patented July 10, 1928.

1,676,414

UNITED STATES PATENT OFFICE.

ANTHONY ROMANO AND RALPH VITALE, OF BROOKLYN, N. Y.

VALVE-RESEATING MACHINE.

Application filed July 14, 1925. Serial No. 43,551.

This invention relates to valve reseating machines, and it consists of the construction, combination and arrangement of parts hereinafter fully described and claimed, and illustrated in the accompanying drawing, wherein:

Figure 1 is a view in side elevation of a valve reseating machine constructed in accordance with my invention;

Figure 2 is a sectional view taken on a plane extending vertically and centrally through the machine;

Figure 3 is a detail sectional view taken on the plane indicated by the line 3—3 of Figure 1, and Figures 4, 5 and 6 are detail views illustrating various means for securing the machine to valves.

Corresponding and like parts are referred to in the following description, and designated in the several views of the accompanying drawing, by similar reference numerals.

The machine comprises an inverted U-shaped bracket 1 the side members 2 of which are provided with outwardly extending horizontal arms 3 and the cross member 4 of which is provided with a bearing 5. The arms 3 are provided with longitudinally extending slots 6 for the reception of attaching bolts 7. A vertical arm 8 extending above and below the cross member 4, is provided at its lower end with a lug 9 extending therefrom in the direction of one of the side members 2 and contacting with said side member. The arm 8 is secured to the side member 2 with which its lug 9 contacts by means of screws 10 which pass through the lug 9 and engage said side member. Adjacent its upper end the arm 8 is provided with an opening 11 in which one end of the bushing 12 is secured.

In practice the machine is applied to the valve with the arms 3 in contact with the flange thereof. If the flange is provided with openings the bolts 7 are employed to secure the machine in place. If the flange is not provided with openings or with bolts that may be employed in connection with the arms 3 to secure the machine in place, each arms 3 is provided with a strap 13. This strap is shown in Figure 4 and is provided with an elongated slot 14 and a lug 15. To permit the machine to be secured to large size valves extension straps are provided, one of such straps being shown in Figure 6 and designated 16. This strap is provided with a plurality of screw threaded openings 17 and an elongated slot 18, it is adapted to be secured to an arm 3 by means of a bolt 7 passing through the arm and engaging in one of the openings 17 and is adapted to be secured to the flange by a bolt 7ª passing through the slot 18 and engaging the flange. In Figure 5 is shown the manner in which the straps 13 and 16 can be used to secure the machine to a valve, and in this and Figures 4 and 6 a designates the body and b the flange of the valve.

A vertical sleeve 19 is rotatably supported in the bearing 5 of the bracket 1 by nuts 20 and ball bearings 21. The nuts 20 have threaded engagement with the sleeve 19 and the ball bearings 21 are positioned between the nuts 20 and the cross member 4 of the bracket 1. A main spindle 22 is carried by the sleeve 19, and is held against rotary movement with respect thereto by keys 23 having threaded engagement with the sleeve and entering a key way 24 in the spindle. A secondary spindle 25 is removably connected to the lower end of the main spindle 22, and is provided at its lower end with a cutter 26. The secondary spindle 25 is provided with flat portions 27 to permit it to be connected to and disconnected from the main spindle 22 by a wrench or other suitable tool. The main spindle 22 is adapted to be adjusted axially or vertically with respect to the sleeve 19 to position the cutter 26 in contact with the valve seat after the bracket 1 has been secured to the valve flange, and it is secured in its adjusted position by nuts 28 threaded thereon and contacting with the ends of the spindle.

The spindle 22 is adapted to be rotated to effect the reseating of the valve by means of a bevel pinion 29 fixed to a shaft 30 and a bevel gear 31 secured to the spindle 19 by a key 32. The pinion 29 is provided with two sets of gear teeth 29ª and 29ᵇ, respectively, and the gear 31 with two sets of teeth 31ª and 31ᵇ, respectively. The pinion 29 is adjustably secured to the shaft 30 in order to permit its gear teeth 29ª to be positioned for engagement with the gear teeth 31ª of the gear 31 when it is desired to rotate the cutter 26 at low speed, or to permit its gear teeth 29ᵇ to be engaged with the teeth 31ᵇ of the gear 31 when it is desired to rotate the cutter at high speed. After the pinion 29 has been adjusted to the desired position on the shaft 30, it is secured against casual movement with respect to the shaft 5 by an element 32. The cutter 26 is rotated at low speed when reseating a valve of steel and at high speed when reseating a valve of brass. The shaft 30 is secured against endwise displacement by collars 33 secured thereto and contacting with the ends of the bushing 12. To permit the machine to be operated a hand crank 34 is secured to the shaft 30.

From the foregoing description, taken in connection with the accompanying drawing, it should be apparent that the machine may be readily and firmly secured to valves of different sizes, and that it may be operated at low speed to adapt it for reseating steel valves and at high speed to adapt it for reseating brass valves. Any sized cutter may be used in connection with the machine. To prevent any oscillation of the upper end of the sleeve 19 during the use of the machine, a strap 35 is provided, and has an opening 36 for the reception of the upper end of the sleeve and is removably secured to the upper end of the arm 8 by a cap screw 37.

While we have described what we now consider to be the best embodiment of the invention we desire to have it understood that the device shown is merely illustrative, and that such changes may be made when desired as are within the scope of the invention as claimed.

What is claimed is:

A valve reseating machine comprising an inverted U-shaped attaching and supporting bracket provided in its cross member with a bearing, arms extending outwardly from the side members of the bracket and provided with longitudinally extending slots, a sleeve extending through the bearing, elements carried by the sleeve at opposite sides of the cross member, bearings surrounding the sleeve and positioned between the elements and cross member, a threaded spindle carried by the sleeve for endwise adjustment with respect thereto, means preventing any relative rotation between the sleeve and spindle, retaining elements mounted on the spindle and contacting with the ends of the sleeve, an arm secured to the bracket and extending beyond the same in parallel relation to the sleeve, a strap secured to the arm and having an opening for the reception of the sleeve, a gear keyed to the sleeve, and provided with inner and outer rows of teeth, a shaft journaled in said last arm between said cross member and gear and extending inwardly and outwardly beyond the rows of teeth of the gear, a pinion provided with inner and outer rows of teeth and adjustably mounted on the shaft for engagement with one of the rows of teeth of the gear, and means for securing the pinion in adjusted position on the shaft.

In testimony whereof we affix our signatures.

ANTHONY ROMANO.
RALPH VITALE.